FIGURE 7
LIQUID PRODUCT (LP) CHARACTERISTICS
VERSUS
CATALYST AGE

FIGURE 8

Dec. 19, 1972          F. W. KIRSCH ET AL          3,706,814
            CONTINUOUS PROCESS FOR PRODUCING GASOLINE
                         BLENDING COMPONENTS
Filed May 4, 1970                              8 Sheets-Sheet 8

FIGURE 9

ISOPARAFFIN-OLEFIN ALKYLATION WITH CRYSTALLINE ALUMINO SILICATES
$C_6, C_8, C_9+$ FRACTIONS VERSUS CATALYST AGE

FIGURE 10

INVENTORS
FRANCIS W. KIRSCH
DAVID S. BARMBY
JOHN D. POTTS
BY
ATTORNEY

United States Patent Office 3,706,814
Patented Dec. 19, 1972

3,706,814
CONTINUOUS PROCESS FOR PRODUCING
GASOLINE BLENDING COMPONENTS
Francis William Kirsch, Wayne, David S. Barmby, Media, and John D. Potts, Springfield, Pa., assignors to Sun Oil Company, Philadelphia, Pa.
Continuation-in-part of applications Ser. No. 581,129, Aug. 25, 1966, now abandoned, Ser. No. 715,998, Mar. 26, 1968, now Patent No. 3,624,173, Ser. No. 716,190, Mar. 26, 1968, Ser. No. 749,714, Aug. 2, 1968, Ser. No. 823,656, May 12, 1969, Ser. No. 830,687, June 5, 1969, now Patent No. 3,655,813, and Ser. No. 840,110, June 16, 1969, now abandoned. This application May 4, 1970, Ser. No. 34,209
Int. Cl. C07c 3/52
U.S. Cl. 260—683.43                                7 Claims

ABSTRACT OF THE DISCLOSURE

A process for the continuous preparation of gasoline blending components comprises contacting, in a continuous stirred reactor, an acidic zeolite catalyst and a liquid feed containing $C_4$–$C_6$ isoparaffin and $C_3$–$C_9$ mono-olefin at 25–200° C. and 14–800 p.s.i., continually introducing the liquid feed and simultaneously continually withdrawing a reactor product stream free of catalyst from the reactor wherein the feed stream and the product stream are introduced and withdrawn respectively at the same rate, the paraffin/olefin molar ratio in the reaction mixture being at least 10 to 1. Preferably an additional acyclic feed component is added, comprising $C_9^+$ olefin or $C_6^+$ paraffin (such as Udex raffinate). Also preferred is to constantly withdraw a slipstream of the reaction mixture containing aged catalyst and to constantly introduce, at the same rate, an active catalyst stream to the reactor and to regenerate and activate the catalyst from said sidestream.

CROSS REFERENCES TO RELATED APPLICATIONS

The present application is a continuation-in-part of all of the following copending applications of the present inventors, Francis William Kirsch, David S. Barmby, and John D. Potts, all of these being assigned to the Sun Oil Company:

| Serial No. | Filing date | Title |
| --- | --- | --- |
| 581,129 [a] | 8-25-66 | Process for Paraffin-Olefin Alkylation. |
| 715,998 [b] | 3-26-68 | Gd Zeolite and Hydrocarbon Conversion Process With Gd Zeolite Catalyst. |
| 716,190 | 3-26-68 | Process for Paraffin-Olefin Alkylation. |
| 749,714 | 8-2-68 | Dy Zeolite and Hydrocarbon Conversion Process With Dy Zeolite Catalyst. |
| 823,656 | 5-12-69 | Paraffin-Olefin Alkylate Composition. |
| 830,687 [c] | 6-5-69 | Continuous Alkylation Process. |
| 840,110 [d] | 6-16-69 | Process for Producing Gasoline Blending Components. |

[a] Now abandoned.
[b] Now U.S. 3,624,173, issued Nov. 30, 1971.
[c] Now U.S. 3,655,813, issued Apr. 11, 1972.
[d] Now abandoned.

The disclosure of all of the above-cited copending applications is hereby incorporated in the present application.

In particular, paraffin and olefin feed components which can be converted to gasoline blending components, in the present invention are disclosed in the above-cited copending applications. The said copending applications also disclose zeolite catalysts which can be used in the present invention, such as the substantially anhydrous acidic crystalline aluminosilicate zeolites which contain cations of a polyvalent metal.

The processes disclosed in the said patent applications for activation, hydration and regeneration of "aged" zeolite catalysts can also be useful in practice of the present process particularly for regeneration of "aged" catalysts which have been used to convert paraffin and olefin feed components to gasoline blending components.

Also useful in understanding the nature of the deposits on "aged" catalyst is the commonly-assigned application of Alfred E. Hirschler, Ser. No. 28,608, filed on Apr. 15, 1970 and titled "Process for Producing Liquid Polymers of Mono-Olefins Using Alumino-Silicate Catalyst" the disclosure of which is hereby incorporated herein.

SUMMARY OF THE INVENTION

Isoparaffin-olefin alkylation with substantially anhydrous acidic alumino-silicate zeolite catalysts can be practiced in a continuous stirred reactor. Halide promoters can be present in solution in the reaction mixture or the catalyst can be treated with a halide.

With isobutane and a $C_4$-monoolefin, such as butene-2, as reactants, $C_5^+$ alkylates can be produced continuously at yields of 180–220 wt. percent based on the olefin charge (OC), of a product alkylate having an F–1 clear octane number in the range of 95–99 for example. Stoichiometric $C_8$ yield from butenes is 204 wt. percent OC.

$C_5^+$ alkylate can be made from isobutane and $C_3$–$C_9$ olefins with cation-exchanged alumino-silicate zeolite catalysts. This kind of isobutane-butene alkylation can have desirably high selectivities (for paraffins instead of olefins or aromatics, for $C_8$ paraffins in general, and for trimethylpentanes in particular).

The feed can also include additional components, such as higher molecular weight acyclic olefins and/or paraffins (e.g. see the previously cited Ser. No. 823,656). Among the additional components are naphthenic-paraffinic naphthas (e.g. "Udex" raffinate, straight-run gasoline, etc.) which can be partially or fully hydrogenated and normal paraffins obtained from such naphthas by conventional molecular sieve adsorption processes. Table VIII attached hereto is illustrative of such a "naphtha upgrading" combined with alkylation. Udex raffinate is a well-known "paraffinic" refinery by-product from the solvent extraction of aromatics (such as benzene, toluene, xylenes) from refinery streams (e.g., catalytic reformates). The Udex process is described, for example, in the following: Bland and Davidson, Petroleum Processing Handbook, 3-103–4, McGraw-Hill (1967); Gruse and Stevens, Chemical Technology of Petroleum (3rd ed.), pp. 335–6, McGraw-Hill (1960); Kobe and McKelta, Jr., Advances in Petroleum Chemistry and Refining, vol. 1, pp. 430–1, 465–6, Interscience Publishers, Inc., New York (1958).

Factors that enhance the catalysis of hydride transfer in a continuous reaction system include the quality of mixing in the reactor.

When the zeolite catalysts deactivate in the present processes, they do not acquire conventional coke deposits—partially because of the 40–110° C. temperature range of reaction. Acid digesting the catalyst and solvent extracting the remaining deposit permits an understanding of its composition by spectral techniques. Additionally, adsorption and desorption experiments have generated data on deposit origin, composition, and removal.

It is particularly useful in the catalyst regeneration step involving oxidative burning to rehydrate such "burned catalyst" (e.g., see previously cited application Ser. No. 823,656).

FURTHER DESCRIPTION AND EXAMPLE

FIGS. 1–4 attached hereto are a representation of a continuous stirred reactor (CSR) and catalyst regeneration apparatus which can be used for the continuous solid-catalyzed isobutane-butene-2 alkylation. The system comprises four sections: feed preparation and blending, reactor, product recovery, and catalyst regeneration.

For example, a catalyst obtained by activation of a highly cerium exchange, ammonium-type Y zeolite in flowing air or helium at 400° C. or higher temperature was cooled to ambient temperature and transported to the reactor site in a pre-dried and nitrogen purged container. It was then charged to the GSR under a dynamic nitrogen blanket. In this way a known amount of activated catalyst was introduced into the reactor without moisture acquisition or ambient air contact.

Immediately after charging the activated catalyst to the CSR, a predetermined amount of isobutane was nitrogen pressured into the reactor from a calibrated Jerguson gauge in the feed preparation section. The agitator was started and the reactor heated to run temperature. Temperature control between 40° and 126° C. was maintained by using West "Gardsman" type JP proportional controllers.

An insobutane-olefin feed mixture could be quantitatively blended in the same Jerguson gauge, and alkyl halide promoter added if desirable. The Jerguson gauge was initially evacuated together with the feed transfer lines to remove any residual components prior to introduction of another component. Dual facilities were available to provide simultaneous feed preparation and charging to the reactor. The charge blend was pumped to the reactor by a Whitey laboratory feed pump (reciprocating diaphragm) of the variable capacity type (10–60 ml./min.).

The reactor was a one-gallon stirred Autoclave Engineers vessel internally baffled with a four-member ring and with provision for an external cooling jacket. Two six-member flat-blade turbines were driven at 350–900 r.p.m. with a Magne-drive. The reactor section was originally designed and fabricated for 1000 p.s.i.g., but the major components were selected from 3000 p.s.i.g. capability.

By means of a dip-tube the liquid feed was charged near the bottom of the reactor directly under the center of the lower turbine. The reactor liquid level was maintained through use of a Foxboro Type 15A 0–5 inch differential pressure (DP) controller. A metered nitrogen purge gas flowed through both sides of the DP cell to minimize the possibility of a pressure imbalance causing a liquid-catalyst mixture to back up into the cell. The high pressure side of the DP cell was connected to a dip-tube which passed below the reactor liquid level. The low pressure side of the DP cell was connected to the vapor space of the reactor. With a constant flow through both sides of it, the DP cell measured the differential pressure in excess of the reactor pressure caused by ejecting nitrogen from the high pressure dip-tube below the liquid surface. The level control was independent of temperature-compensating density effects. The level controller actuated an Annin Model 5060 motor valve (Flo-Mike "A" trim) on the liquid outlet line to maintain a constant level.

The catalyst was separated from the reactant-product mixture inside the reactor through a Capital-Westward 10-micron stainless steel filter screen. No catalyst plugging was encountered, and no fines were observed in the liquid product.

Since nitrogen was continuously being introduced into the reactor through the differential pressure cell, a Foxboro type M/11GM pressure controller (50–600 p.s.i.g.) was required to maintain a constant pressure on the vapor space. The pressure controller positioned another Annin valve on the high pressure gas outlet line.

The reactant-product liquid mixture leaving the reactor passed through a water condenser and then into a low pressure gas-liquid separator. The low pressure gas was either vented, sampled, or collected in a 5-cubic foot (STP) gas holder for composite sampling.

Quality control of the process is best effected by continual analyses of the catalyst free reaction mixture. The gases were analyzed by two chromatographic columns in series: a 50-ft. column with 20% DMS on 69–80 mesh Chromosorb W and a 16-ft. column with 5% TCP and 20% DC-500 on the same packing. The chromatograph was a Perkin-Elmer 154D operated at 35° C. and 40 p.s.i.g. helium pressure and using a thermistor type detector. Liquids were analyzed on a Perkin-Elmer 226 capillary gas chromatograph with a 150-ft. x 0.01 in. stainless steel column coated with squalene. It was programed from 25 to 120° C. and operated at 20 p.s.i.g. helium pressure with a flame ionization detector.

Isobutane and butene-2 were Matheson C.P. Grade, purified over Linde 5A molecular sieve. Any halogenated paraffins were Eastman White Label grade.

To prepare catalysts, Linde sodium Type Y crystalline aluminosilicate, in which about 70% or more of the sodium had been replaced by ammonium, was further cation-exchanged with a variety of rare earth salt solutions, dried, and activated before use. With typical $SiO_2/Al_2O_3$ ratios of 4.3 to 4.8 a rare earth cation such as lanthanum could then be present at levels sufficient to satisfy the stoichiometric requirements imposed by the alumina tetrahedra in the low-sodium zeolite crystal lattice. Calculation of these levels shows a possible range of lanthanum from 0.6 to 13.5 wt. percent for a $SiO_2/Al_2O_3$ ratio of 4.6.

Desorption and regeneration experiments on used catalysts establish that hydrocarbon is retained by the catalyst after alkylation and that all of it cannot be desorbed by gases without some accompanying reaction. Digestion of used catalyst with 2 N aqueous HCl for 20 minutes at ambient temperature, followed by 30 minutes at the maximum operating temperature to which the catalyst was subjected, destroyed the catalyst structure by removing aluminum and rare earth and liberated an organic layer extractable with chloroform or carbon tetrachloride for IR, NMR, or GC analyses.

DESCRIPTION OF THE DRAWINGS

For a more complete description of the continuous process of this invention, reference should be made to the accompanying figures illustrating our continuous stirred reactor system wherein.

Figure 1:
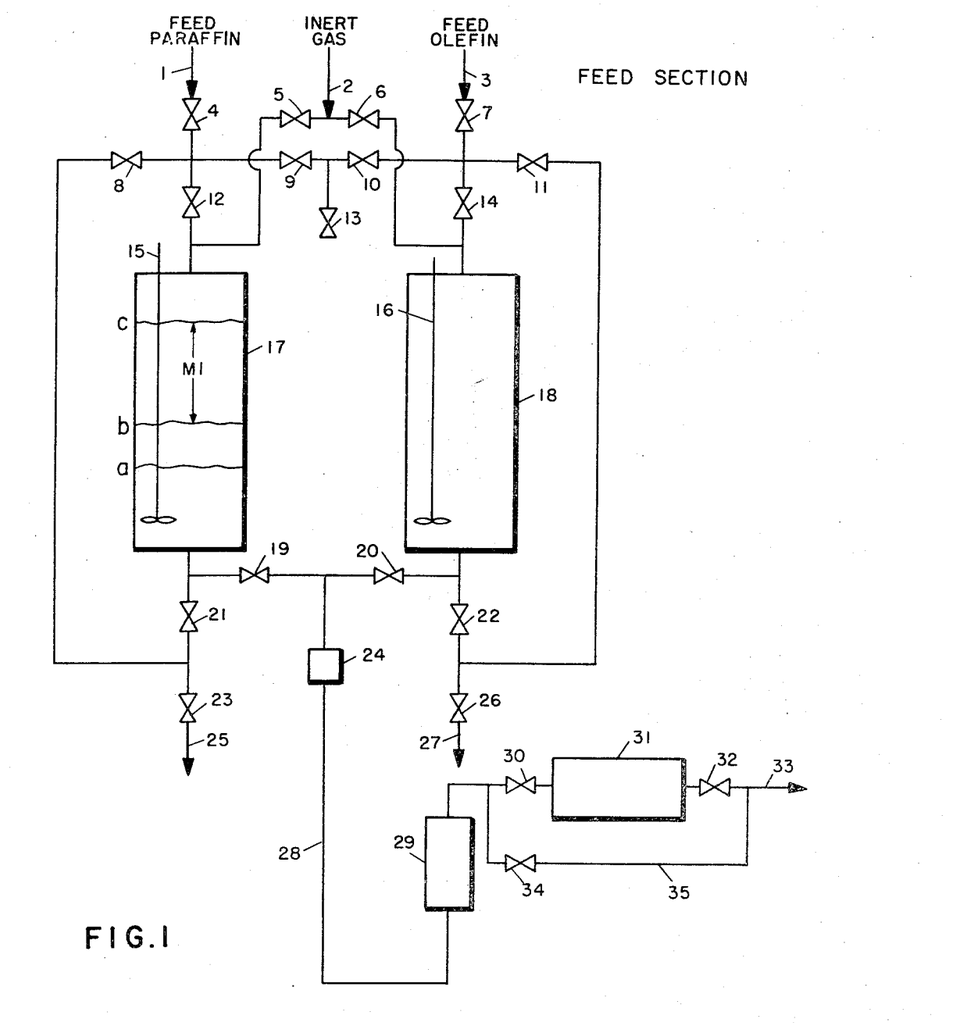
FIG. 1 represents the feed section.

As shown in FIG. 1, a valving arrangement at the top of the mixing vessels 17 and 18 allows feed paraffin 1 or feed olefin 3 to be placed in either vessel 17 or vessel 18 from either the top or the bottom of the vessel. For example, paraffin can be introduced through the bottom of vessel 17 by closing valves 9, 12, 19, and 23 and opening valves 4, 8, and 21. Then, feed olefin 3 is transported to vessel 17 by closing valves 4, 11, 12, 14, 19, 13 and 23 and opening valves 7, 8, 9, 10, and 21. Alternately, the mixing of the incoming feed olefin and feed paraffin can be effected by means of an inline mixer; however, for precise control of the reactant proportions and to insure intimate admixing of paraffin and olefin, we prefer that a substantial amount of paraffin admixed with olefin be maintained in a stirred mixing vessel as vessels 17 and 18.

Similarly, by sequencing the position of the valves, the feed paraffin and the feed olefin can be introduced in any desired pattern. One sequence of placing feed paraffin and feed olefin in vessel 17 is to allow feed paraffin to enter vessel 17 to a level a. Sufficient feed olefin is then brought into vessel 17 to produce a volume of paraffin-olefin admixture represented by level b. The remainder of the required paraffin feed is added to vessel 17 until the level of the total feed mixture is at c. Such a sequence of paraffin-olefin-paraffin addition allows for better internal mixing of the reactants in vessel 17. In addition, uniform mixing is insured by mixing devices 15 and 16, such as turbine blade rotary mixers. We have also found that additional mixing can be accomplished by bringing the inert gas head into the bottom of the mixing vessel as through valve 21 rather than into the top of the vessel as through valve 12. It should, of course, be noted that it is not a critical limitation that the feeds be premixed since they can be fed directly to the reactor individually as long as the rates of each feed are properly controlled. However, premixing of the feeds is preferred since the reaction is beneficially effected by intimate contacting of the feeds.

Figure 2:
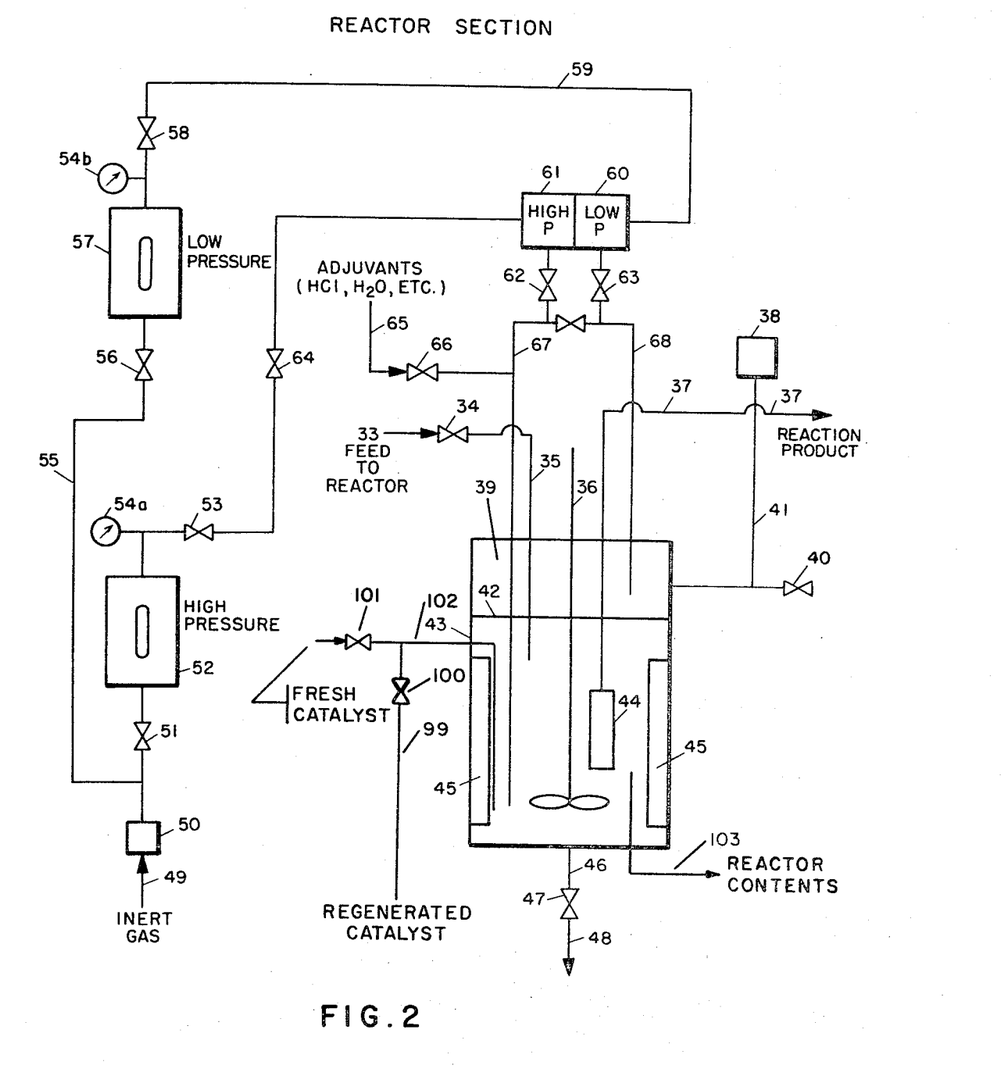
FIG. 2 represents the reactor section.

It is generally preferable to introduce feed components to the mixing vessels in a number of alternate portions (except when the feed components are simultaneously proportioned into an inline mixer) to insure uniform mixing. Similarly, sequencing of valves can be used to fill vessel 18 while the mixture in vessel 17 is being fed to the reactor 43 (FIG. 2). In order to use vessel 17, regardless of whether vessel 18 is being filled or not, pressure, as by inert gas 2 (e.g., nitrogen), is imposed upon the liquid in vessel 17, as by closing valves 12, 19, and 21 and opening valve 5. Normally, the nitrogen head is allowed to build up until the pressure in the mixing vessel is about 50 p.s.i. less than the pressure in the reactor 43.

In order to allow a mixed paraffin-olefin feed to enter the reactor 43, the nitrogen head is imposed upon vessel 17 and valve 19 is opened. A constant head pressure on vessel 17 allows the pump 31 to pump the mixed feed through line 33 to the reactor at a constant and desired rate.

When valve 19 is open, the feed mixture passes through a microfilter 24 which protects the pump and meters from damage caused by foreign particles, then through a high pressure rotometer 29 which serves as a flow indicator. The feed can then enter the pump 31 when valve 30 is open; and when valve 32 is open and 34 closed, the feed is pumped into the reactor 43. In the event of a pump failure, valves 30 and 32 may be closed, needle valve 34 opened, and the nitrogen head increased sufficiently to allow the feed to flow through line 35 to line 33 and then to the reactor 43.

FIG. 2 illustrates the reactor section comprising a continuous stirred reactor vessel and the associated lines and valving required for introducing feed and catalyst, removing reaction products and reactor contents, and for operating the differential pressure cell which is used for liquid level control. The reactor also contains heat transfer and control means (as a water jacket and electrical heaters, not shown) for maintaining the desired reaction temperature. The paraffin-olefin feed from line 33 enters the reactor 43 through valve 34 and line 35. To insure maximum olefin dilution, we prefer that the liquid feed be allowed to enter below the reactor liquid level 42 and in the vicinity of the mixing means 36. Active catalyst is fed to the reactor through line 102 which may be fresh catalyst passed through valve 101, regenerated catalyst from line 99 through valve 100, or a mixture of both.

The liquid level is controlled by a differential pressure cell, hereinafter DP cell, having a high pressure section 61 and a low pressure section 60, the differential pressure being in the range of 5 to 50 inches of water column. Inert gas 49 enters the DP cell through an inline filter 50 from which it diverges through meter 52 to the high pressure section 61 and through meter 57 to the low pressure section 60. That is, for the high pressure section, valve 51 is open, allowing the inert gas stream to flow through the high pressure meter 52 through open needle valve 53 and valve 64 into the high pressure side 61 of the DP cell, then through valve 62 into a line 67 which leads below the liquid level 42 in the reactor. Pressure gauges 54a and 54b indicate the pressure in the high pressure side and the low pressure side, respectively. Other pressure gauges, thermometers, and analytical devices can be advantageously incorporated into the four sections comprising the apparatus of FIGS. 1, 2, 3, and 4; however, for simplicity, such devices are not shown in the figures.

The inert gas can also be diverted through valve 56 to the low pressure meter 57 through needle valve 58 to the low pressure side 60 of the DP cell and then through valve 63 and line 68 to the vapor space above the liquid level 42 in the reactor. In operation, the DP cell senses a differential pressure which is equal to the height of liquid through which the inert gas from the high pressure side of the cell must travel from the bottom of line 67, which must be below the liquid level, to the vapor space 39. The difference between the pressure of the high side 61 and the pressure of the low side 60 of the DP cell is approximately equal to the pressure required to push a bubble of gas through the height of the liquid. Since the DP cell measures the mass of a column of fluid (pressure) and not the volume, its measurement is independent of temperature; and although at several temperatures the actual level of the liquid will vary somewhat, the mass of the volume of liquid above the opening line 67 can be maintained at a constant valve regardless of the temperature and pressure of the reactor.

The nitrogen or other inert gas which is introduced through the DP cell can be vented through a valve system 40, which can consist of an Annin control valve (a spline-type, highly sensitive metering device) and a block valve ahead of the Annin valve. The Annin valve can be actuated by a pressure controller 38 in order to maintain a constant pressure in the vapor space of the reactor.

Catalyst-free reaction mixture is removed from the reactor via line 37 through valve system 69 (FIG. 3), which can consist of an Annin valve and a hand-block valve ahead of the Annin valve. The liquid reaction mixture is separated from the suspended catalyst particles by means of a submerged screen 44 and is withdrawn from the reactor through line 37. Although screen plugging is not a frequent occurrence, the screen can be backflushed with nitrogen if plugging occurs. This nitrogen backflush can enter the reactor through line 37 and the excess nitrogen vented through valve system 40 in order that the reactor pressure is maintained constant. This flushing can be effected while the catalyst particles are maintained in suspension and the reaction mixture is maintained in contact with the catalyst particles. In order to effectuate the continuous process with respect to the used catalyst, reactor contents including catalyst are removed from the reactor via line 103 through a metering-type valve system not shown and are passed into the regeneration section of FIG. 4. The valve system included herein would meter the amount of catalyst being removed in the stream. In the event that it is desired to drain the entire contents of the reactor, this can be accomplished through line 48, flush valve 47, and line 46. For example, if deposit builds up on the reactor baffles 45, the reaction mixture can be dumped by opening valve 47, and then cleaning materials can be pumped into, and removed from the reactor through the same valves and lines.

The gases removed via valve 40 can be sent to a gas meter which can also contain devices for chemical analysis or sampling. For example, the gases so removed can contain HCl from the halide adjuvant. The HCl concentration in the vapor space is preferably maintained at a constant partial pressure, as by adjusting the quantity of adjuvant which enters the reactor via line 65, valve 66, and line 67. Such adjuvants can also be introduced into the reactor if they are directly added to the paraffin-olefin feed in the mixing vessels 17 and 18.

Figure 3:
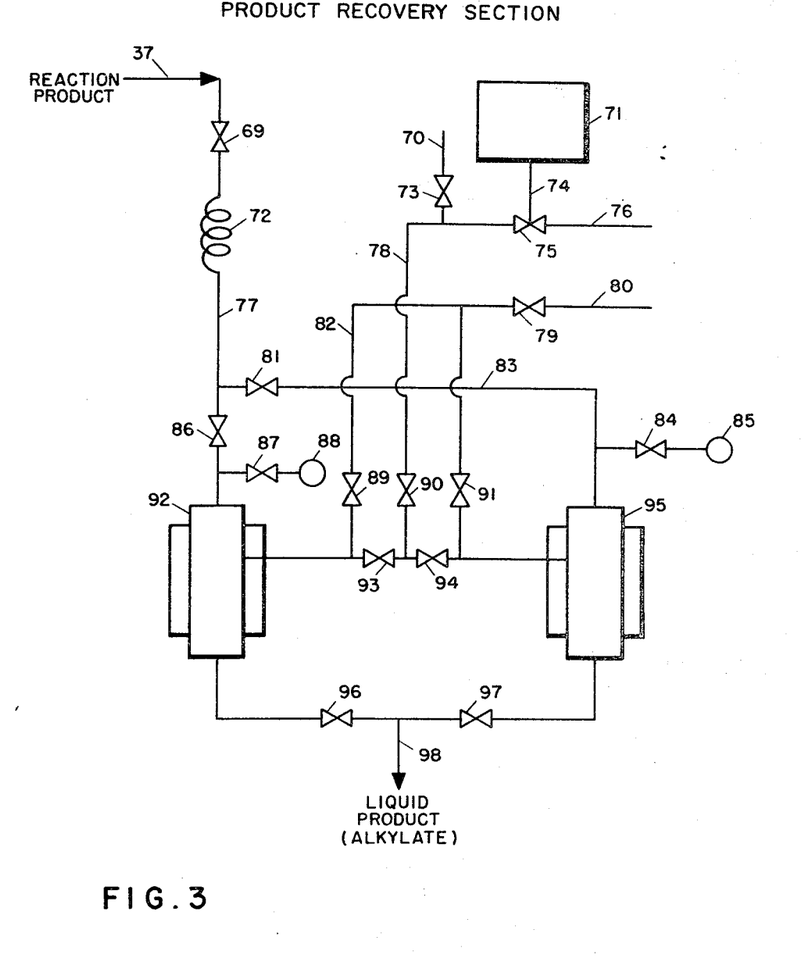
FIG. 3 represents the product section.

The catalyst-free liquid reaction product comprising $C_5^+$ "alkylate," unreacted feed isoparaffin, some $C_5^-$ paraffin product, and usually a small amount of unreacted feed olefin is removed from the reactor via line 37 and passes through valve 69, where the pressure is reduced from reactor pressure to 25 p.s.i. or less, to the condenser 72. The condensed liquid and noncondensed gas, e.g., feed isoparaffin, and inert gas, e.g., nitrogen, pass through valve 86 into vessel 92, or, alternately, through valve 81 to vessel 95. We prefer to have two such collecting vessels in order that product can be collected in one vessel while product is removed from the other vessel. The liquid product removed from these vessels can be transported to product storage tanks or to a means for blending the alkylate with other gasoline components in order to make a blended gasoline product which can be transported to a stabilizer and then to storage area or to tank trucks, etc.

In the product recovery section illustrated in FIG. 3, the liquid porduced by condensation of gaseous products in condenser 72 and uncondensed gases pass through line 77 and valve 86 (valve 81 is closed) and enter vessel 92, which is maintained at a temperature and pressure such that liquid alkylate can be removed via valve 96 through line 98 (valve 97 is closed) to tank trucks, a blending area, storage tanks, etc. Uncondensed gases, which consist primarily of unreacted feed isoparaffin, leave vessel 92 via valves 93, 90, and 75 (valves 94, 89, and 73 are closed) and can be passed to means for gas purification and separation 71 or, under some conditions, can be recycled to the reactor or to the mixing vessels via line 76 or via valve 73 and line 70. Minor amounts of the halide promoter which may be present in the reaction product can be removed as by means of an adsorbent which can be between valve 69 and the condenser 72, or at any other appropriate location in the product recovery section. When the halide promoter is a readily distillable gas such as HCl or methyl chloride, it can be removed from the reaction product by an intermediate condensation. There can be present in the reaction mixture, as a promoter, a halide selected from the organic and inorganic compounds of fluorine, chlorine and bromine.

Adjuvants such as carbon tetrachloride or tertiary butyl chloride can be added either directly to the reactor as by line 33, valve 34, and line 35 or to one of the feed components such as the isoparaffin or to the paraffin-olefin mixer in the mixing vessel 17 or 18; however, in the event that the promoter can react with the microfilter 24 or cause corrosion in the pump 31, it is preferred that the adjuvant be added at some point after the pump as by line 65, valve 66, and line 67 (the high pressure side of the DP cell). Thus the promoter becomes dispersed in the flowing nitrogen from the high pressure side of the DP cell and passes into the reactor below the liquid level and bubbles up through the reactor contents.

Figure 4:
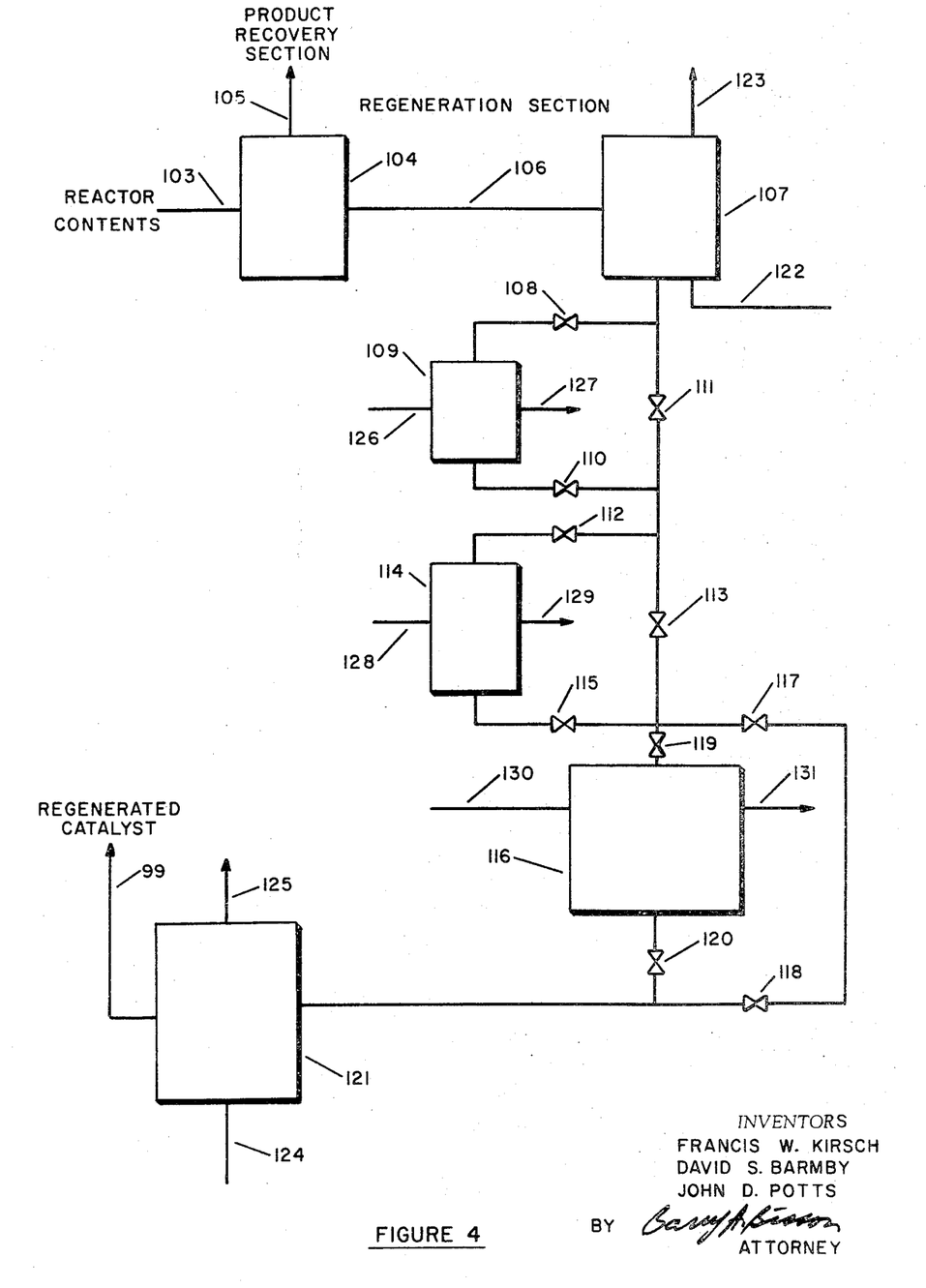
FIG. 4 represents the regeneration section.

The reactor contents in the slipstream 103, after leaving the reactor, are passed into the regeneration section, depicted in FIG. 4. The reactor contents, including the catalyst, are first fed into a separator 104. As aforementioned, the separator can be any type well known in the art. The separated accompanying hydrocarbon, which consists mainly of alkylate reaction product and unreacted feed isoparaffin, is then passed via line 105 to join in with the primary reaction product line 37. The separated catalyst then passes by line 106 to the regenerator 107. Within the regenerator, the coked catalyst is subjected to an inert gas or sorbate via line 122 which tends to strip the carbonaceous deposit from the surface of the catalyst. As aforementioned, the temperature in the reactor is generally maintained at a temperature in the range of 25° to 500°C. The regenerant stream exists via line 123.

Depending upon the mode of regeneration and the temperature maintained in the regenerator, the regenerated catalyst can then be subjected to various secondary processes. For example, if an inert gas such as helium is employed for the regeneration and the temperature is maintained below that temperature used for initial activation of the fresh catalyst, then the only necessary subsequent step in the process is the reactivation of the catalyst. As shown in the schematic, this can be accomplished by closing valves 108, 110, 112, 115, 119, and 120, opening valves 111, 113, 118, and 117, and allowing the regenerating catalyst to pass directly into the activator 121 where the catalyst is subjected to an inert gas or air 124 at activation temperatures in the range of 400° to 450° C. The activated, regenerated catalyst leaves the zone via line 99 and can then be recombined with fresh catalyst being fed to the reactor, while the activating medium leaves via line 125.

Other possibilities following the regeneration include purging the sorbate where such is used, a second regeneration with air if so desired, and the rehydration of the catalyst where regeneration temperatures exceeded the original activation temperatures. These steps can be carried out individually or in combination as desired. For example, if the regeneration was carried out above the activation temperature with a sorbate such as ammonia, it would be desirable to purge the sorbate and rehydrate the catalyst. As such, following the regeneration valve 111 would be closed, valves 108 and 110 would be opened, and the regenerated catalyst would be allowed to pass through the purging apparatus 109. The purge stream enters and leaves through lines 126 and 127, respectively. Subsequently, with valves 111, 112, 115, 117, and 118 closed and valves 113, 119, and 120 open, the purged catalyst would be rehydrated in the rehydration zone 116 at temperatures less than said regeneration temperature. The rehydration stream, an inert gas mixture or air containing 5 to 10% by weight water, is introduced in line 130 and leaves via line 131. The catalyst would then be fed to the activating means 121.

Further, if it is desired that the catalyst be subjected to a second regeneration by air, then an air regeneration zone 114 is provided. Passage of the catalyst into this zone is accomplished by opening valves 112 and 115 and closing valve 113. The air enters and leaves through lines 128 and 129, respectively.

The sorbates which can be used in catalyst regeneration include $NH_3$, $SO_2$, $CO_2$, fluorohydrocarbons, and amines. As a further alternative, following the regeneration with the inert gas or sorbate, combustive regeneration with an oxygen-containing gas such as air may take place at temperatures not exceeding 600° C.

As a further condition to the reuse of the regenerated catalyst, it must be rehydrated at controlled conditions when the catalyst is regenerated at temperatures above that employed for the original activation of the catalyst. For example, a catalyst originally activated at 400° C. and having a small but critical water content will contain less water after regeneration at 500° C. In such a case, rehydration is necessary. By controlled conditions, we means subjecting the regenerated catalyst to an inert gas mixture of air containing 5 to 10% by weight water at temperatures below said regeneration temperature. Following rehydration, the catalyst is reactivated at the same conditions and in the same manner used for activating fresh catalyst; for example, subjecting the catalyst to inert gas or air at a temperature of about 400° to 450° C.

Of further import, when a sorbate such as ammonia is used during the regeneration, it is necessary to remove from the catalyst surface, as by purging with inert gas and/or steam at temperatures generally in the range of 100° to 300° C., as much sorbate as is possible to remove after regeneration. Otherwise, the sorbate could act as a poison toward alkylation or could be rapidly burned if air contacts the catalyst.

FURTHER EXAMPLES AND DISCUSSION

Figure 5:
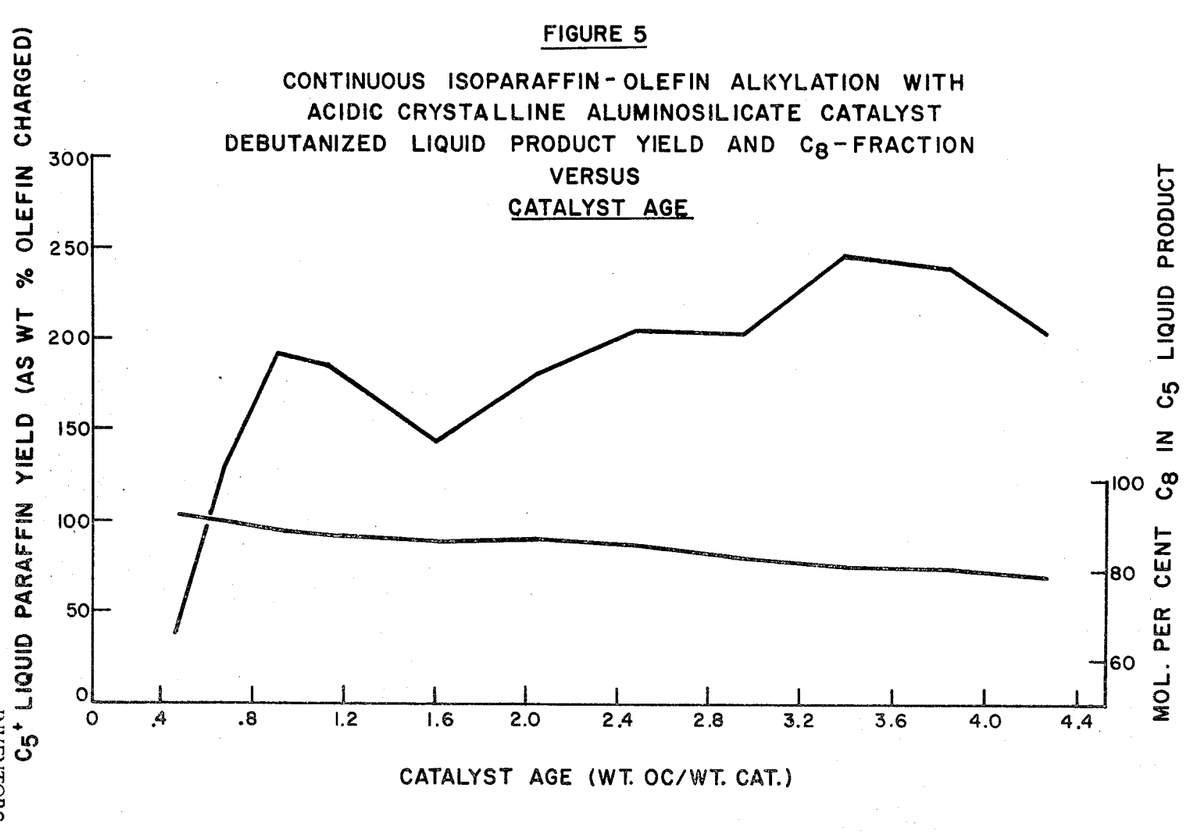

In a CSR reactor system of the type shown in the figures, product yields, with isobutane and butene-2 as the feed, reached and stabilized near stoichiometric, and octane numbers of accepted "debutanized" alkylates were at least 93.5 and often as high as 98.5 F-1 clear. Activity was maintained as long as sufficient catalyst sites remain deposit-free. That time is intrinsically governed by process parameters, but it is economically controlled by how often regeneration is permissible. The attached FIGS. 5–7 and Tables I–IV present typical analytical data on the more significant properties of the debutanized alkylate. Tables V and VI present data on the deposit discovered on "deactivated" or spent catalysts. Tables VII and VIII present analyses of the alkylate from batch runs wherein a normal paraffin or "Udex" raffinate was present as a feed component. FIG. 5 also shows that when an isobutane-butene feed is brought into a stirred reactor, a measurable time is needed before alkylate yield reaches its peak and remains there.

In our previously cited application Ser. No. 716,190, for example, we disclosed the importance in a batch process of maintaining excess isobutane in the reactor as well as the importance of thorough contact among catalyst, isoparaffin, and olefin by good mechanical or fluid-mixing. A continuous stirred system emphasizes the criticality of these variables. In the continuous system, feed dilution can inhibit effective reaction rate, and residence time can be indirectly decreased. In short, a CSR is different enough from a batch system to necessitate a higher degree of catalyst reactivity. If that is not possible, the potential for preferred reactions must be otherwise increased—for example, by non-catalytic parameters such as temperature. Preferred reactions are those giving desired products such as trimethylpentanes. In many catalytic processes, highest yields of total product are accompanied by lowest yields of the more desirable components in these products. On the other hand, alkylation achieves high total paraffin yields only when selectivity for $C_8$ and TMP is high.

Some appreciation for the inherent kinetic handicap of a continuous system can be realized from probability calculations. For example, in a single stage reactor with the mean holding time in the reactor equal to the kinetic time, only about 37% of the reactants actually remains in a single-stage for that length of time. The remaining 63% gets through in less time. Deficiencies in reactant mixing will impede yield and selectivity. One measure of mixing was evident from batch experiments that showed improvements in $C_5^+$ yield and in its $C_8$ content as the number of turbine blades increased (Table I).

PROCESS PARAMETERS

Any factor that allows the reactor to accumulate more butenes than can be alkylated is self-defeating. Not only will catalyst life be shortened, but the olefin content of the alkylate will go up. Poor mixing in the reactor is a major cause and deactivated catalyst is another. In either case, hydride transfer is inhibited or diminished, and olefin content of the alkylate necessarily rises. The formation of paraffin and olefin products can occur according to a classical carbonium ion scheme such as As long as the kinetics of hydride transfer—such as that shown from isobutane—remains favorable, little or no proton elimination and olefin formation should occur.

Figure 7:
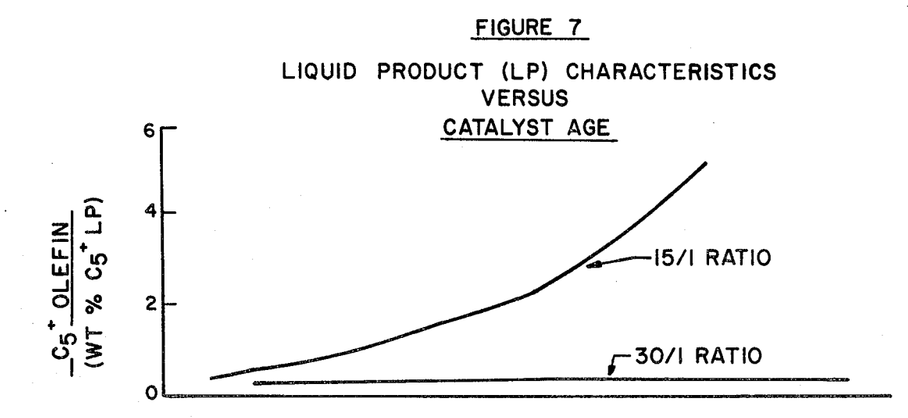
Figure 8:
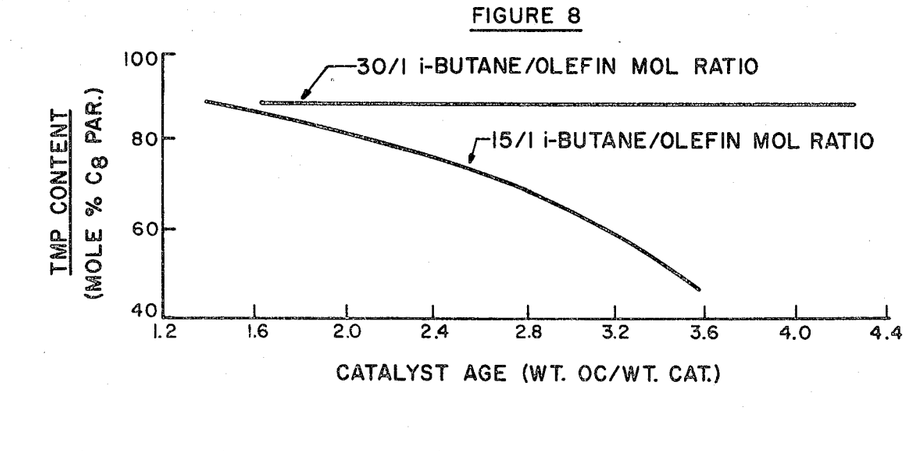

These concepts were tested further by a run made deliberately to observe effects of higher olefin concentration in the reactor (FIGS. 7 and 8). Doubling the butene content of the continuous feed system raised $C_5^+$ olefin content by about an order of magnitude: from a typical 0.2–0.6% to 4.0–5.0%. This behavior is consistent with the mechanism proposed, either by proton transfer to butene monomer or dimer or to another base. The order-of-magnitude increase was noticeably accompanied by an alkylate yield loss and by a $C_9^+$ fraction that was formed about twice as rapidly as $C_6$. Yield loss can be accompanied by increasing $C_5^+$ olefin if for any reason the hydride-transfer capabilities of the system are exceeded by butene availability in the reactor. Catalysts with diminished capabilities for making alkylate still retained their hydride transfer capacity relative to the intermediate cations present at any given time, as illustrated by the retention of paraffinicity in the product. But when this balance was perturbed—such as by high olefin feed content—high $C_5^+$ olefin formation occurred readily.

Figure 6:
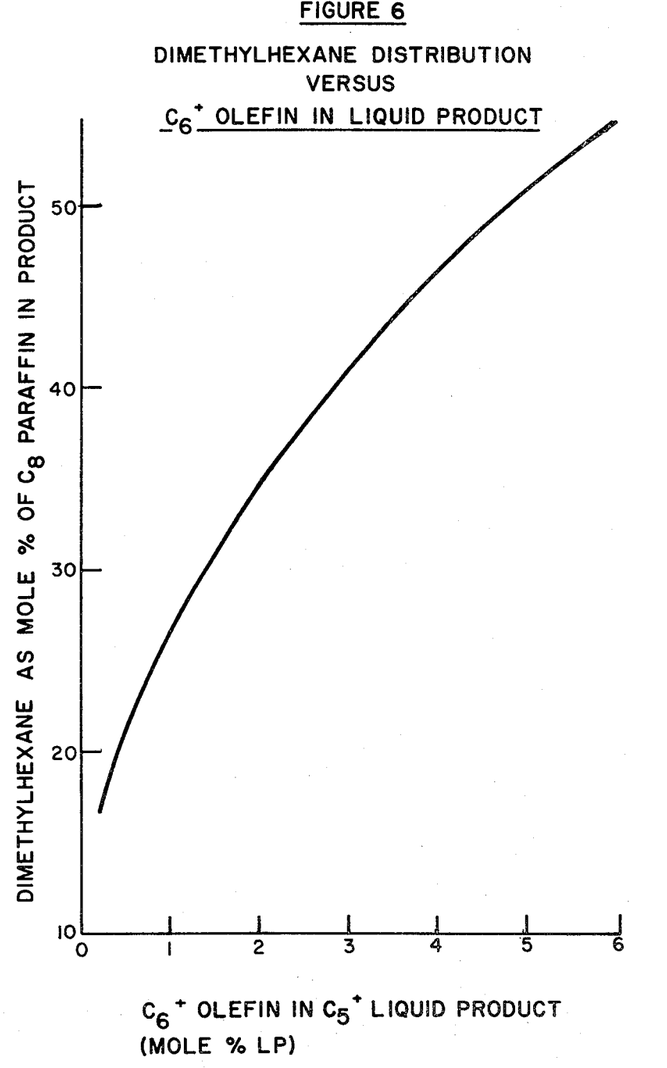

As a corollary effect, selectivity for trimethylpentanes eventually deteriorated in favor of dimethylhexanes and methyl heptanes, possibly by such reactions as:

rather than:

FIG. 6 illustrates the correspondence found between high $C_6^+$ olefin and dimethylhexanes.

Whether the continuous reactor was run 24 hours per day or only 8 hours per day on consecutive days had little effect upon the results (Table II). This conclusion is relative, however; if unreacted butenes or other olefins remained in contact with the catalyst, an activity loss typically became evident. This situation, depicted in Table II, facilitated continuous alkylation research as long as butene alkylation was virtually complete. When less than all the butene was alkylated, any unreacted olefin hastened catalyst deactivation during long contact.

CATALYST AGING AND PRODUCT DISTRIBUTION

Figure 9:
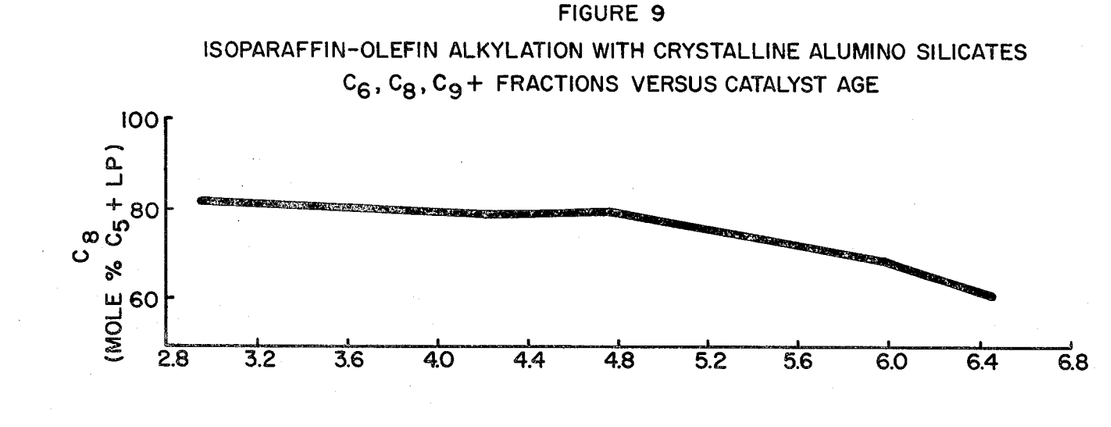
Figure 10:
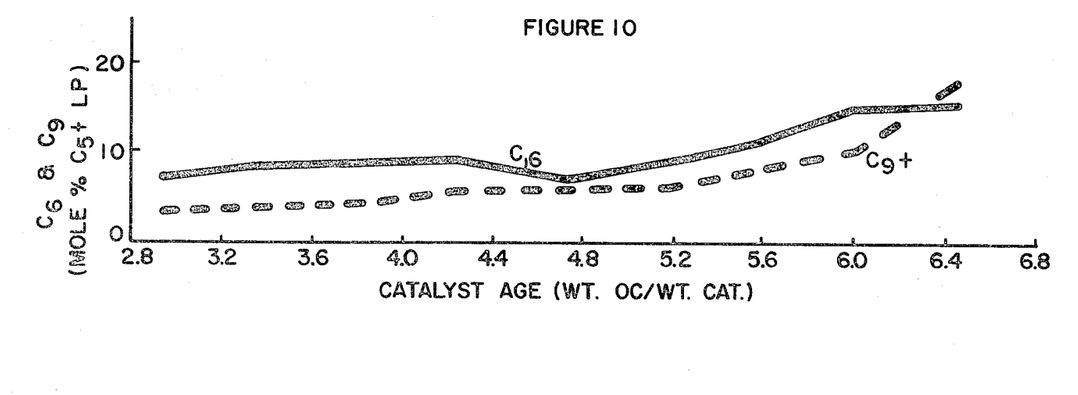

As the catalyst aged, the $C_8$ paraffin content of the alkylate was recognized as the most sensitive indicator of impending deactivation (Table III). Decreasing $C_8$ was typically accompanied by increasing $C_6$ and $C_9^+$ paraffins (FIGS. 9 and 10) rather than a gain in $C_5^+$ olefins or a loss in trimethylpentanes. During early stages of a run $C_5^+$ olefin gains and TMP losses are more characteristic of a drastically changed reaction medium (FIGS. 7 and 8). Very late in a run, when catalyst activity had been seriously impaired, $C_5^+$ olefins and dimethylhexanes became larger fractions of the liquid product. At that late stage the catalyst had lost most of its hydride transfer ability, which is commonly associated with the strongest acid sites. Even then, however, the liquid product was predominantly saturated, with $C_5^+$ olefins rarely exceeding 10.0 wt. percent. These phenomena strongly support the concept that more activity is lost via a decreasing number of sites rather than by seriously decreasing the specific activity of still-functioning sites.

The seemingly direct interchange of $C_6$ and $C_9^+$ for $C_8$ also supports the concept of a $C_{12}$ or larger cation as a precursor, just as has been proposed for $H_2SO_4$ catalysts. If that cation were $C_{12}H_{25}^+$—$C_{16}H_{33}^+$ or other large species are equally suitable—the following scheme could be applicable:

and

Interestingly, these proposed paths can account for the saturate nature of the products as well as the interdependence of $C_8$, $C_6$ and $C_9^+$ paraffins—including $C_{12}$. Not to be overlooked is the other part of the suggested product— t-butyl cation, which agrees with the observed maintenance of alkylation despite byproduct $C_6$ and $C_{12}$ formation.

These concepts utilizing hydrocarbon cations to interpret data are consonant with zeolite structures having ionic sites for hydrocarbon bonding with the surface. This ionic bonding is in addition to conventional chemisorption and other sorptive forces that provide for catalyst-reactant interaction.

INTEGRATED YIELD OF ALKYLATE

As a process, alkylation is a generic term encompassing several reactions and it is possible for a significant trend to be obscured by the volume of data generated.

To coalesce continuous alkylation results into a theoretically sound but usable form, the *integrated yield* technique was developed from a graphical representation of product and component yields as the catalyst aged (FIG. 5). Yields of alkylate and its components were plotted as functions of age, expressed as wt. percent olefin charged/unit catalyst weight. All yields were graphically represented per olefin charged to facilitate integration.

To determine integrated yield, alkylate yield is plotted for each product collection period as a function of catalyst age, expressed in terms of olefin charged. The area under the segmented curve can be calculated by numerical integration—the effect being one of summing up a series of basic geometric areas. When the product collection periods form only a small part of the total on-stream period, the areas approximate trapezoidal form. If product is collected continuously, the upper point of the area should be widened, and the area approximates a rectangle. As applied here, the integrated alkylate yield per unit catalyst weight is automatically obtained. An analogous technique can be applied to any product component expressed and plotted per olefin charge.

Sensitivity of the integrated yield to the mathematical integration technique employed was examined briefly. The question to be decided was whether measuring area under the curve by a series of point-to-point trapezoids or by a series of region-to-region rectangles produced different integrated yields of alkylate/weight catalyst. No significant difference arising out of mathematical technique was found. For example, in a typical run a difference of only 0.6 relative percent between integrated yields was attributable to mathematical technique. From these facts, integration based upon the trapezoid technique had narrow enough regions of olefin charge/catalyst to make it applicable over an entire run—as alkylate yield at first increased, then stabilized at or near stoichiometric and eventually declined.

One important quality aspect of integrated yield is the need to put a lower limit on acceptability of products—a uniform criterion by which all alkylates can be compared and accepted or rejected. When this aspect is considered, then the integrated yield technique becomes a valid and valuable tool for judging process, catalyst, or both. For total alkylate yield, the lower limit of acceptability was set at 60 mole percent $C_8$ among the paraffins. Ample justification for this standard will be evident when product octane numbers are examined further.

To illustrate the application of integrated yield to process parameters, olefin content in the charge is a good choice. As pointed out previously, excess olefin not only damages selectivity and depreciates yield, but also shortens catalyst life. These data reveal how much:

Paraffin/olefin feed ratio (molar)—
　　　　　　　　　　Integrated alkylate yield

| | |
|---|---|
| 14 | 3.39 at 3.16 wt. OC/wt. cat. |
| 30 | 5.27 at 3.16 wt. OC/wt. cat. |
| 30 | 10.79 at 6.46 wt. OC/wt. cat. |

Rather pointedly, integrated yield demonstrated how deleterious the high olefin is. With $C_4$–$C_6$ isoparaffin the molar ratio of isoparaffin to monoolefin in the feed to the reactor can be at least 25 to 1.

Correlating alkylate yield with catalyst age suggested the possibility of further utility for the functionality observed. Closely examining FIG. 5 shows that the yield started at a low level and reached its peak near the stoichiometric level at a catalyst age of about 1 olefin charge/catalyst weight. Throughout the entire time, butene was completely consumed, as judged from effluent gas analysis. Many other runs, not shown here, behaved similarly—with a consistency beyond coincidence. Without further examination it was impossible to explain why alkylate formed was proportionately and consistently less. It could represent a simple catalytic induction period or it could signify the formation of a catalyst-hydrocarbon complex, or it could come from some other source entirely. These possibilities were examined because doing so could lead to a better understanding of how isoparaffin-olefin alkylation starts and proceeds over exchanged zeolites as catalysts.

FUNCTION OF THE CATALYST SITE

To speak of an induction period for crystalline zeolite catalysts does not really add much dimensionality to the picture. Instead, it seemed preferable to pursue a hypothesis about this occurrence and evaluate it against experimental facts, provided the hypothesis is analogically well grounded.

The art has reported a gradual increase in specific alkylate yield with $H_2SO_4$-catalyzed alkylation over a period of more than 20 hours. Formation of a catalyst-hydrocarbon complex with at least $C_{12}$ species was inferred. Hirschler, A., had also discussed formation of a catalyst-olefin carbonium ion in other acid-catalyzed reactions such as isomerization and hydrogen-transfer. (See the previously cited application of Hirschler.)

If this concept applies to alkylation with zeolite catalyst, then it is reasonable to expect a correspondence between the hydrocarbon retained on the catalyst after start-up and the number of active sites available. On one particular catalyst, chemical analyses and gravimetry had established the existence of a maximum of $1.61 \times 10^{-3}$ acidic SiOH sites per gram of catalyst. Straightforward ionic binding of $C_4H_8$ monomer units on a 1/1 basis at active protonic sites could retain up to 0.0903 g. hydrocarbon/g. catalyst.

To test this concept, three distinct and separate alkylations were examined. The purpose was to calculate how much hydrocarbon was actually retained per unit weight of catalyst during early operation. That number came from the following weight balance:

HC retained = $[\Sigma$ (olefin chg.) $\times 2.0]$ $- [\Sigma$ ($C_5^+$ paraffin) measured]

$-$ [measured holdup in lines and calc. holdup in reactor]

For these three runs the hydrocarbon retained soon reached an apparently stable level at: 0.504, 0.428, and 0.459 g./g. catalyst. The respective catalyst ages for these levels were: 0.68, 0.68, and 0.77 wt. butene/wt. catalyst. Perhaps the most interesting aspect of these results is their consistency in amount of hydrocarbon retained and the age at which this stable retention was reached.

Sorption data at 25° C. from the vapor-phase [1] imply that maximum hydrocarbon retention on zeolites is about 0.5 wt./wt. zeolite *under those conditions*. Two factors mitigate against sorption as an adequate explanation of what occurs here: (1) the liquid-solid system itself contains an overwhelming amount of isobutane—enough to desorb other hydrocarbons held merely by sorption energies; and (2) the fact that the hydrocarbon-catalyst complex survives under these conditions—that is, all the isobutane was evidently unable to desorb from the catalyst the higher molecular weight hydrocarbon that evidently formed a complex approaching ionic bonding in its behavior.

On the basis of 0.0903 g. hydrocarbon/g. catalyst and these measured retentions, the number of butenes held were 5.58, 4.74, and 5.08 molecules/site, corresponding to carbon numbers of $C_{19}$ to $C_{23}$ for the hydrocarbon-catalyst complex. Preliminary measurements on catalyst deposits were not truly quantitative but they did include highly branched material with carbon numbers in that range, as shown by extraction, capillary gas chromatography, and NMR.

---

[1] Breck, D. W., and Flanigen, E. M., Synthesis and Properties of Union Carbide Zeolites L, X, and Y, papers and discussion from Conference on Molecular Sieves, SCI, London, SW. 1, 1968, pp. 47–61.

These considerations are unable to distinguish whether the hydrocarbon retained on the catalyst was a protonated butene polymer (I) or another alkylate precursor (II). Either could be similarly structured and highly saturated in its ionic state. Typical examples can be represented schematically by:

(I) $n(C_4H_8) + H^+ \rightleftharpoons [(C_4H_8)_{n-1}(C_4H_9)]^+$ or (II) $C_4H_8 + C_4H_{10} + H^+ \rightleftharpoons [(C_8H_{17}):(C_8H_{18})]^+$ In summation, some kind of hydrocarbon-catalyst complex was evidently formed with consistency during early stages of continuous isobutane-butene alkylations with zeolite catalysts. Its nature is consistent with carbonium ion theory in general and published findings from $H_2SO_4$ alkylation in particular. In any event, the process of the present invention enables the art to continuously produce high quality gasoline blending components from a feed comprising paraffins and olefins in the $C_3$–$C_{24}$ range and, with the catalyst regeneration step disclosed herein, allows the catalyst to be continually reused despite catalyst deposit.

ALKYLATE QUALITY

Previous discussion established that basically integrated yield includes a quality factor. To count as alkylate the product criterion was set at 60 mole percent $C_8$ among the paraffins. A less stringent criterion would unfairly inflate catalyst life. If selectivity should diminish below the 60 mole percent level products were not counted as part of the integrated yield. This choice was vindicated by the high octane numbers of the alkylates, as the following example will demonstrate. Of two runs—made under widely differing conditions—one apparently lost activity very rapidly (Table III). The second was still making almost twice as much alkylate per unit time when it was about twice as old. To be more exact, integrated yield was 10.79 weight alkylate/wt. catalyst for the longer lived run; for the shorter one, only 3.39, which is just 30% as large. Irrespective of precise age—whether measured in time, in olefin per unit catalyst weight, or in total hydrocarbon charged—the one run produced only 30% as much alkylate as the other when the same quality standard was applied to the products of each run. That is a quantitatively definite conclusion. Furthermore, alkylates from the longer-lived run had research octane numbers between 98.1 and 94.2 F–1 clear while those from the shorter run were between 98.1 and 97.4. Note the high level in each case; a less stringent criterion would have lowered that level.

The following distribution of octane numbers was found among 61 products sampled randomly during this research:

| Number of alkylates— | F–1 clear range |
| --- | --- |
| 16 | 98.0+ |
| 12 | 97.0–97.9 |
| 19 | 96.0–96.9 |
| 9 | 95.0–95.9 |
| 5 | 93.6–94.9 |

Each contained at least 60±1 mole percent $C_8$ among the paraffins.

An interesting sidelight on these octane numbers was discovered by comparing their experimental and calculated values. Ordinarily agreement was very good (Table IV). But when the $C_9^+$ fraction—conveniently subdivided by gas chromatography into $C_9$, $C_9+C_{10}$, and $C_{10}^+$—amounted to more than 5 or 6 mole percent of the alkylate, a disparity arose between calculated and experimental octane numbers. To obtain agreement, it was necessary to assign these three fraction values of 100–110 F–1 clear. Then the experimental and calculated octane numbers agreed within one number and very often the difference did not exceed 0.7 number. Apparently, the $C_9^+$ fraction of the alkylate was very highly branched.

NATURE OF THE CATALYST DEPOSIT

Zeolite catalyst removed from an alkylation reactor contains residual hydrocarbons that have not formed coke.

Two different approaches were used to explore the nature of this deposit. One was its desorption in non-oxidizing media followed by analysis via gas chromatography; the other was digestion of the solid in aqueous HCl followed by solvent extraction and various analyses of the hydrocarbon phase.

A used alkylation catalyst stripped by a helium stream at 80° C. appeared to emit something resembling an unstabilized alkylate (Table V). Continuing the experiment to 200° C., however, produced some clear-cut differences in the desorbed material:

(1) Its $C_9^+$ content went from 0.8 wt. percent at 80° C. to 27.0 wt. percent at 200° C.—probably by desorption.

(2) Its isopentane content increased from 2.5 to 10.5%.

(3) Dimethylpentanes diminished from 8.4 to 2.1% and 2,2,4-TMP decreased from 17.4 to 1.8%.

These observations indicate both primary and secondary cracking reactions—possibly from a common reservoir of large, highly branched cations retained on the catalyst. Some of them were held up to 200° C., at which temperature they produced both types of cracking. It is difficult to explain how isobutane—constituting 10.8% of the product at 200° C.—survived until that temperature unless it was derived either by cracking of large molecules or by hydride transfer to t-butyl cations held on anionic catalyst sites.

Secondly, cracking of 2,4-dimethylpentane or 2,2,4-trimethylpentane could readily follow the beta-scission rule by mechanisms such as the following:

and

These mechanisms also support the proportionately smaller decrease found in the other TMP isomers, which are less readily cracked. Without isomerization of their cations to the 2,2,4-trimethylpentyl form, only the 2,3,4-TMP could be expected to crack while following the beta-scission rule.

At 275° C. and higher temperatures, catalyst residue turned dark, and IR and NMR evidence for the first time revealed olefinic and aromatic unsaturation in it.

DEPOSIT REMOVAL

A slightly expanded series of desorption experiments was made at 80° C. on a used catalyst with helium, helium-plus-ammonia, and helium-plus-carbon dioxide. In these experiments gas composition probably had little effect on the reactivity of the catalyst surface, which was largely occluded by hydrocarbons. Measured surface areas of these catalysts were only 10–15 m.²/g. instead of the 800–900 m.²/g. found on uncontaminated samples. The similarities in products agree with their independence of gas composition *under these conditions*.

Evidently at 80° C., which was no higher than the alkylation temperature, some cracking occurred during gas desorption. A close comparison of the last alkylate produced and the hydrocarbons desorbed from the same catalysts support this conclusion (Table VI).

Underlying the chief comparison to be made from these experiments is the hypothesis that most of desorbed products come from a common precursor cation. Relative to the alkylate, characteristics of the desorbed material stand out—higher $C_6$ paraffins and lower TMP and $C_{10}^+$. Table VI shows that the gain in $C_6$ can be accommodated almost perfectly by the loss in $C_{10}^+$ and TMP. Occurring as it does in three separate experiments, this compensation is considered more than coincidental. Although they are not sufficient for proof, these data represent a necessary condition if $C_{10}^+$, TMP, and $C_6$ are to have a common origin.

At 200° C., gas medium affects catalyst performance, as shown by the following compositions of the desorbed condensates:

|  | $C_{10}^+$, wt. percent |
|---|---|
| He | 28.0 |
| He+$NH_3$ | 97.3 |
| He+$CO_2$ | 81.4 |

$NH_3$ and $CO_2$ appear to inhibit cracking—probably by interacting with bare catalyst surface.

In another pair of experiments, air calcination of deposit from stripped catalysts revealed that the one after (He+$NH_3$) treatment contained 0.86 wt. percent less deposit than one treated with He alone. When these same catalysts were first hydrated and then measured for ignition loss at 1000° C., the one treated with He alone lost 0.85% more than the one treated with (He+$NH_3$). The higher deposit on the He-treated catalyst could have accounted for the added ignition loss.

Without oxidation, not all deposit was removable, but that part held most tenaciously naturally occupied potentially active sites. With oxidation, catalyst activity was completely restored.

TABLE III.—ISOPARAFFIN-OLEFIN ALKYLATION WITH SOLID CATALYSTS

[Integrated yield, quality concept]

| Run description | Catalyst age (wt. OC/wt. catalyst) | Integrated yield (wt. alk./wt. catalyst) | $C_8$ (mole percent LP) |
|---|---|---|---|
| 30/1 par/ole (molar) | 1.6 | 1.8 | 86.2 |
|  | 2.5 | 3.4 | 85.3 |
|  | 3.4 | 5.3 | 80.6 |
| 15/1 par/ole (molar) | 1.4 | 0.9 | 73.5 |
|  | 2.3 | 2.2 | 65.1 |
|  | 3.2 | 3.4 | 60.0 |

TABLE IV.—ISOPARAFFIN-OLEFIN ALKYLATION WITH SOLID CATALYST

[F-1, clear octane number—experimental versus calculated]

| Sample designation | B1 | B2 | B3 | B4 | B5 | B6 |
|---|---|---|---|---|---|---|
| Experimental [1] | 98.1 | 98.5 | 97.9 | 97.8 | 95.4 | 94.2 |
| Calculated A [2] | 98.07 | 97.00 | 96.87 | 95.99 | 93.74 | 91.06 |
| A (Calculated-experimental) | −0.03 | −1.50 | −1.03 | −1.81 | −1.66 | −3.14 |
| Calculated B [3] | 98.73 | 97.71 | 97.77 | 97.11 | 95.86 | 93.78 |
| B (Calculated-experimental) | +0.63 | −0.79 | −0.13 | −0.69 | +0.16 | −0.42 |
| $C_9^+$ (mol percent $C_5^+$ LP) | 3.6 | 3.9 | 4.8 | 6.0 | 9.4 | 13.9 |

[1] F-1 clear O.N. from engine lab.
[2] Calculated F-1 clear using $C_9^+$, O.N.=80.
[3] Calculated F-1 clear using $C_9$, O.N.=110, $C_9$-$C_{10}$, O.N.=110, $C_{11}^+$=100.

TABLE V.—ISOPARAFFIN-OLEFIN ALKYLATIONS WITH SOLID CATALYSTS

[Helium stripping of used catalysts]

| Stripping temperature, °C | 80 | 200 |
|---|---|---|
| Desorbed condensate: |  |  |
| Pr | | 0.3 |
| i-B | 11.1 | 10.8 |
| B-ene | 1.1 | 1.0 |
| i-P | 2.5 | 10.5 |
| n-P | | 0.1 |
| P-ene | 0.2 | |
| 2,3-DMB | 4.2 | 3.2 |
| 2-MP | 0.8 | 2.6 |
| 3-MP | 12.0 | 1.5 |
| n-Hx | | |
| 2,4-DMP | 5.6 | 1.2 |
| 2,2,3-TMB | 0.4 | 0.1 |
| 2-MHx | 0.4 | 0.8 |
| 2,3-DMP | 2.8 | 0.9 |
| 3-MHx | 0.4 | 0.6 |
| 2,2,4-TMP | 17.4 | 1.8 |
| Hp-ene | 0.7 | |
| 2,2-DMHx | | |
| 2,5-DMHx | 1.7 | 1.7 |
| 2,4-DMHx | 3.0 | 2.3 |
| 2,2,3-TMP | 2.5 | 1.3 |
| 2,3,4-TMP | 13.8 | 11.8 |
| 2,3,3-TMP | 13.5 | 12.6 |
| 2,3-DMHx | 4.2 | 5.8 |
| 2-MHp | 0.1 | 0.2 |
| 4-MHp | | 0.1 |
| 3,4-DMHx | 0.7 | 1.4 |
| 3-MHp | 0.1 | 0.3 |
| 2,2,5-TMHx | 0.6 | 2.6 |
| $C_9$-ene | | |
| 2,2,4-TMHx | | 0.1 |
| $C_9$ | 0.2 | 1.8 |
| $C_9$+$C_{10}$ | | 5.1 |
| $C_{10}$ | | 17.4 |

TABLE I.—ISOPARAFFIN-OLEFIN ALKYLATION WITH SOLID CATALYSTS

[Batch versus continuous operation]

| Run description | $C_5^+$ yield (wt. percent LP/OC) | Paraffin (mole percent) | | TMP distribution (mole percent) | | | |
|---|---|---|---|---|---|---|---|
| | | $C_9^+$ | $C_8$ | 2,2,4 | 2,2,3 | 2,3,4 | 2,3,3 |
| Batch w./2-inch six-blade flat turbine | 116.6 | 4.3 | 71.1 | 31.7 | 5.8 | 26.0 | 36.5 |
| Batch w./3-inch six-blade flat turbine | 140.8 | 2.8 | 74.9 | 31.3 | 6.3 | 25.3 | 37.1 |
| Continuous w./two 3-inch six-blade flat turbines | 204 | 4 | 83 | 35.0 | 7.6 | 24.2 | 33.2 |

TABLE II.—ISOPARAFFIN-OLEFIN ALKYLATIONS WITH SOLID CATALYSTS

[Continuous versus intermittent mode]

| Run description | Cat. age (wt. OC/wt. cat.) | $C_5^+$ product (wt. percent OC) | Paraffins (mole percent LP) | | TMP in $C_8$ (percent) |
|---|---|---|---|---|---|
| | | | $C_8$ | $C_9^+$ | |
| Intermittent [1] | 0.6 | 182 | 89.8 | 3.2 | 89.0 |
| | 1.6 | 184 | 84.2 | 4.2 | 87.4 |
| | 2.6 | 177 | 81.0 | 8.5 | 86.0 |
| Continuous [2] | 0.6 | 100 | 91 | 3 | 90 |
| | 1.6 | 175 | 86 | 4 | 87 |
| | 2.6 | 204 | 83 | 4 | 87 |

[1] 8-hours/day on consecutive days.
[2] 24-hour operation.

TABLE VI.—ISOPARAFFIN-OLEFIN ALKYLATIONS WITH SOLID CATALYSTS

[Comparison of alkylate with stripped material from used catalysts]

|  | Observed (weight percent) | | | Calculated (weight percent), $C_6$* |
|---|---|---|---|---|
|  | TMP | $C_{10}$* | $C_6$ |  |
| Alkylation | 41.8 | 16.8 | 13.0 ($C_6°$) |  |
| Stripping and cracking: |  |  |  |  |
| Helium | 33.1 | 7.9 | 31.2 | 30.6 |
| Helium plus $NH_3$ | 28.5 | 0.4 | 41.0 | 42.9 |
| Helium plus $CO_2$ | 29.3 | 4.8 | 41.0 | 37.5 |

* Calculated $C_6 = |\Delta(TMP)| + |\Delta(C_{10}+)| + C_6°$.

The invention claimed is:

1. A continuous process for the preparation of a gasoline blending component comprising (a) contacting a mixture of $C_3$–$C_9$ monoolefin and $C_4$–$C_6$ paraffin with hydrogenated Udex raffinate and with a solid, substantially anhydrous acidic crystalline alumino-silicate zeolite catalyst within a reactor, at a temperature below the critical temperature of the lowest boiling hydrocarbon reactant, at a pressure such that each of the reactants is at least partially in liquid phase, and wherein the monoolefin and paraffin are present in such proportions that the

TABLE VII.—UPGRADING UDEX RAFFINATE WITH ISOBUTANE/BUTENE AT 100° C.

[Charge stock pre-hydrogenated, $NH_4CeY$ catalyst used]

|  | Charge stock | Butane/butene ratio [a] | | | | | | |
|---|---|---|---|---|---|---|---|---|
|  |  | 15.32 | 15.32 | 14.67 | 13.57 | 26.80 | 29.42 | 15.00 |
|  |  | HUR/butene ratio | | | | | | |
|  |  | No | 0.638 [b] | 0.475 | 0.500 | 1.148 | 1.263 | 0.500 |
|  |  | Butane/HUR ratio | | | | | | |
|  |  | HUR | 24.04 [b] | 30.88 | 27.14 | 23.34 | 23.30 |  |
|  |  | Run number | | | | | | |
|  |  | 539604 | 539610 | 585954 | 585992 | 585974 | 585990 | 586006 [c] |
| Total yield, wt. percent HUR chg | 100 |  | [b] 232.40 | 192.53 | 197.50 | 139.19 | 144.43 | 127.08 |
| Calculated F-1 clear | 50.4 |  |  | 81.6 | 82.5 | 72.5 |  |  |
| Net yield $C_5$+ saturates as wt. percent OC |  |  | 125.64 | 150.78 | 72.55 | 80.98 | 74.57 | 93.03 | 80.33 |
| Distribution, mole percent: |  |  |  |  |  |  |  |  |
| $C_9$+ | 0.00 | 6.51 | 8.74 | 6.94 | 7.83 | 4.32 | 3.62 | 8.00 |
| $C_8$ | 6.36 | 71.34 | 65.39 | 52.35 | 51.76 | 41.14 | 38.48 | 46.60 |
| $C_7$ | 44.09 | 9.91 | 10.34 | 22.29 | 20.25 | 28.08 | 30.27 | 3.91 |
| $C_6$ | 26.96 | 8.02 | 9.18 | 10.35 | 11.91 | 14.85 | 15.15 | 4.22 |
| $C_5$ | 4.63 | 4.20 | 6.32 | 2.12 | 3.29 | 2.89 | 2.19 | 1.32 |
| MCP/CH | 5.90 | 0.00 | 0.00 | 1.19 | 2.05 | 2.07 | 2.16 | 35.93 |
| DMCP/ECP | 2.62 | 0.00 | 0.00 | 0.75 | 0.89 | 1.64 | 1.81 |  |
| MCH | 5.05 | 0.00 | 0.00 | 1.93 | 1.75 | 2.80 | 3.16 |  |
| TMCP | 0.67 | 0.00 | 0.00 | 0.37 | 0.20 | 0.33 | 0.51 |  |
| DMCH | 3.65 | 0.00 | 0.00 | 1.65 | 1.03 | 1.83 | 2.61 |  |
| $C_8$ TMP | 0.00 | 81.01 | 80.75 | 75.04 | 75.23 | 67.32 | 72.41 | 72.69 |
| $C_8$ DMHx | 37.00 | 18.40 | 18.70 | 20.88 | 20.47 | 26.31 | 19.74 | 25.23 |
| $C_8$ MHp | 44.66 | 0.59 | 0.55 | 2.82 | 3.21 | 4.18 | 5.37 | 2.06 |
| $C_8$ n-OC | 18.33 |  | 0.00 | 1.26 | 1.07 | 2.16 | 2.46 | 0.00 |
| $C_7$ TMB | 0.44 | 3.53 | 0.49 | 1.53 | 1.13 | 2.61 | 0.78 |  |
| $C_7$ DMP | 13.47 | 86.14 | 11.88 | 31.71 | 30.44 | 21.55 | 19.77 |  |
| $C_7$ EP | 2.59 | 0.00 | 0.00 | 2.51 | 2.79 | 2.70 | 2.40 |  |
| $C_7$ MHx | 50.86 | 10.32 | 1.59 | 36.78 | 37.57 | 42.79 | 46.00 |  |
| $C_7$ n-Hp | 32.61 | 0.00 | 86.02 | 27.44 | 28.04 | 30.33 | 31.03 |  |
| $C_6$ DMB | 6.17 |  |  | 24.34 | 25.91 | 15.62 | 13.14 |  |
| $C_6$ MP | 46.07 |  |  | 41.02 | 43.02 | 42.40 | 43.97 |  |
| $C_6$ n-Hx | 47.75 |  |  | 34.63 | 31.06 | 41.97 | 42.87 |  |
| $C_5$ MB | 60.00 |  |  | 87.44 | 91.11 | 84.15 | 81.08 |  |
| $C_5$ n-P | 40.00 |  |  | 12.55 | 8.89 | 15.84 | 18.91 |  |

[a] All ratios are molar. HUR=Hydrogenated Udex Raffinate.
[b] n-Heptane used in this run rather than HUR.
[c] MCP used in this run: 92.7 wt. percent MCP, 5.8% CH, 1.4% n-Hx.

TABLE VIII.—UPGRADING n-DODECANE DURING ALKYLATION

[BSR runs, 100° C., $NH_4$ CeY catalyst, TBC promoter]

| Run number | Type[a] | n-$C_{12}$/ $n_{Be}$ | $n_B$/ $Be^n$ | $n_B$/ $n_{C-12}$ | n-$C_{12}$ conv. | $C_5$+ par. yield, wt. percent OC | $C_5$+ product distribution, mole percent | | | | | TMP in $C_8$ |
|---|---|---|---|---|---|---|---|---|---|---|---|---|
|  |  |  |  |  |  |  | $C_9$+ | $C_8$ | $C_7$ | $C_6$ | $C_5$ |  |
| 539594 | P | 0.638 | 15.31 | 24.00 | 33.61 | 163.12 | 9.58 | 70.30 | 8.56 | 7.46 | 4.10 | 80.88 |
| 539634 | P | 1.259 | 15.31 | 12.16 | 9.67 | 142.01 | 15.34 | 62.73 | 8.68 | 8.23 | 5.00 | 78.04 |
| 585910 [b] | P | 0.629 | 15.31 | 24.34 | 14.60 | 125.90 | 8.87 | [c]53.51 | 14.35 | 14.02 | 9.22 | 89.85 |
| 585962 | C | 0.366 | 7.62 | 20.82 | 29.04 | 100.72 | 13.33 | 65.33 | 8.77 | 8.36 | 4.18 | 78.21 |
| 585956 | C | 0.319 | 15.12 | 47.40 | 55.86 | 104.00 | 5.86 | 74.63 | 9.66 | 6.69 | 3.14 | 79.51 |
| 539642 | C | 0.636 | 15.29 | 24.04 | 35.66 | 85.06 | 5.03 | 77.29 | 7.88 | 5.99 | 3.78 | 81.00 |
| 585958 | C | 0.956 | 15.12 | 15.82 | 23.03 | 145.00 | 7.51 | 71.44 | 8.32 | 8.92 | 3.78 | 80.65 |
| 585908 | C | 1.060 | 25.48 | 24.04 | 34.56 | 167.31 | 8.84 | 70.64 | 8.34 | 7.34 | 4.81 | 80.76 |
| 585964 | C | 1.139 | 29.56 | 25.95 | 23.12 | 161.12 | 8.46 | 75.21 | 7.49 | 5.71 | 3.11 | 81.46 |
| 585982 | C | 1.139 | 29.44 | 25.85 | 34.45 | 160.20 | 7.87 | 75.05 | 7.36 | 6.00 | 3.71 | 82.14 |
| 585984 [d] | C | 1.060 | 25.48 | 24.04 | 26.91 | 147.22 | 12.12 | 72.78 | 8.43 | 5.25 | 3.30 | 82.10 |
| 585906 | [f] |  |  | 15 |  | 123.48 | 6.05 | 71.00 | 10.50 | 8.50 | 4.95 | 80.57 |
| 585940 | [e] |  |  | 15 |  | 158.63 | 6.72 | 74.19 | 7.98 | 6.50 | 4.60 | 86.40 |

[a] Type refers to pulse (P) or continuous (C) mode of charging n-$C_{12}$.
[b] An equal volume of 2,2,4-TMP preceded the n-$C_{12}$.
[c] Net.
[d] $CCl_4$ promoter at 16.1 mm./m. OC was used instead of tertiary-butyl chloride (TBC).
[e] 100° C. check.
[f] 80° C. check.

unreacted olefin in the reaction mixture is maintained at less than 12 mole percent;

(b) continuously introducing said mixture of $C_3$–$C_9$ monoolefin and $C_4$–$C_6$ paraffin in proportions so as to maintain the unreacted olefin in the reaction mixture at less than 12 mole percent, the molar ratio paraffin to olefin being at least 10 to 1, and continuously withdrawing a reactor product stream free of catalyst, wherein said monoolefin and paraffin and product stream are being introduced and withdrawn, respectively, at the same rate; and (c) separating an upgraded liquid conversion product comprising $C_5$–$C_9$ saturated hydrocarbons from said reactor product stream, said upgraded conversion product being useful as a gasoline blending component.

2. The process of claim 1 wherein there is present in the reaction mixture as a promoter a halide selected from the organic and inorganic compounds of fluorine, chlorine and bromine.

3. The process of claim 1 wherein (i) said catalyst of step (b) is allowed to remain in contact with reactants for a period at least sufficient to permit the hydrocarbon retained on the catalyst to be equal to about 5 molecules of feed olefin per site, followed by constant withdrawal of a slipstream of the reaction mixture containing said catalyst and a constant introduction of an active catalyst to the reactor, wherein said catalyst in said slipstream and said active catalyst are being withdrawn and introduced at the same rate;

(ii) stripping carbonaceous deposits from the surface of said catalyst from said slipstream by subjecting it to a regenerant selected from the group consisting of an inert gas, an inert sorbate, or mixtures thereof at regeneration temperatures; and (iii) activating said regenerated catalyst for reintroduction into said reactor.

4. The process of claim 3 wherein said regenerated catalyst is activated by oxidative burning followed by rehydration.

5. Process of claim 4 wherein the regenerated and rehydrated catalyst contains in the range of 0.2 to 5 molecules of water per atom of aluminum in the aluminosilicate framework of the zeolite.

6. The process of claim 1 wherein $C_4$–$C_6$ paraffin of step (a) is an isoparaffin and the molar ratio of isoparaffin to monoolefin in the feed to the reactor is at least 25 to 1.

7. The process of claim 1 wherein the reaction takes place at a temperature in the range of from 25° to 200° C. and at a pressure in the range of from 14 to 800 p.s.i.

References Cited

UNITED STATES PATENTS

| | | | |
|---|---|---|---|
| 3,236,761 | 2/1966 | Rabo et al. | 260—683.43 |
| 3,251,902 | 5/1966 | Garwood et al. | 260—683.43 |
| 3,549,557 | 12/1970 | Bolton et al. | 252—455 Z |

DELBERT E. GANTZ, Primary Examiner

G. J. CRASANAKIS, Assistant Examiner

U.S. Cl. X.R.

260—683.47